United States Patent
Bangalore et al.

(10) Patent No.: US 8,798,990 B2
(45) Date of Patent: *Aug. 5, 2014

(54) METHODS AND SYSTEMS FOR NATURAL LANGUAGE UNDERSTANDING USING HUMAN KNOWLEDGE AND COLLECTED DATA

(71) Applicant: AT&T Intellectual Property II, L.P., Atlanta, GA (US)

(72) Inventors: Srinivas Bangalore, Morristown, NJ (US); Mazin Gilbert, Warren, NJ (US); Narendra K. Gupta, Dayton, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/873,548

(22) Filed: Apr. 30, 2013

(65) Prior Publication Data

US 2013/0311170 A1    Nov. 21, 2013

Related U.S. Application Data

(63) Continuation of application No. 11/188,825, filed on Jul. 25, 2005, now Pat. No. 8,433,558.

(51) Int. Cl.
| | |
|---|---|
| G06F 17/20 | (2006.01) |
| G06F 17/27 | (2006.01) |
| G06F 17/21 | (2006.01) |
| G10L 15/28 | (2013.01) |
| G10L 15/18 | (2013.01) |
| G10L 15/14 | (2006.01) |

(52) U.S. Cl.
USPC ...... 704/9; 704/1; 704/10; 704/231; 704/243; 704/257; 704/255; 704/256; 704/275; 715/233; 715/231; 715/256

(58) Field of Classification Search
CPC . G10L 2015/00; G10L 2015/06; G06F 17/20; G06F 17/21; G06F 17/241; G06F 17/27; G06F 17/2705; G06F 17/2715; G06F 17/2765; G06F 17/277; G06F 17/2775; G06F 17/28
USPC ......... 704/1–10, 231, 257; 715/233, 231, 256
See application file for complete search history.

(56) References Cited

U.S. PATENT DOCUMENTS

| | | | |
|---|---|---|---|
| 5,027,406 A | 6/1991 | Roberts et al. | |
| 5,640,487 A | 6/1997 | Lau et al. | |

(Continued)

OTHER PUBLICATIONS

Chen, Z., Wenyin, L. and Zhang, F. (2002). A New Statistical Approach to Personal Name Extraction. In the Proceedings of the Nineteenth International Conference on Machine Learning. Morgan Kaufmann Publishers Inc.

(Continued)

Primary Examiner — Paras D Shah

(57) ABSTRACT

Disclosed herein are systems and methods to incorporate human knowledge when developing and using statistical models for natural language understanding. The disclosed systems and methods embrace a data-driven approach to natural language understanding which progresses seamlessly along the continuum of availability of annotated collected data, from when there is no available annotated collected data to when there is any amount of annotated collected data.

17 Claims, 5 Drawing Sheets

(56) References Cited

U.S. PATENT DOCUMENTS

| | | | |
|---|---|---|---|
| 5,839,106 | A | 11/1998 | Bellegarda |
| 6,052,682 | A | 4/2000 | Miller et al. |
| 6,188,976 | B1 | 2/2001 | Ramaswamy et al. |
| 6,609,087 | B1 | 8/2003 | Miller et al. |
| 6,983,247 | B2 | 1/2006 | Ringger et al. |
| 7,124,080 | B2 * | 10/2006 | Chen et al. ............. 704/244 |
| 7,191,119 | B2 * | 3/2007 | Epstein et al. ............. 704/10 |
| 7,263,489 | B2 | 8/2007 | Cohen et al. |
| 7,275,033 | B1 | 9/2007 | Zhao et al. |
| 7,292,976 | B1 | 11/2007 | Hakkani-Tur et al. |
| 7,299,180 | B2 | 11/2007 | Wang et al. |
| 7,478,038 | B2 | 1/2009 | Chelba et al. |
| 7,610,191 | B2 * | 10/2009 | Gao et al. ............. 704/9 |
| 7,805,302 | B2 * | 9/2010 | Chelba et al. ............. 704/257 |
| 7,835,910 | B1 * | 11/2010 | Hakkani-Tur et al. ........ 704/243 |
| 7,970,600 | B2 * | 6/2011 | Chen et al. ............. 704/9 |
| 2002/0022956 | A1 | 2/2002 | Ukrainczyk et al. |
| 2003/0083863 | A1 * | 5/2003 | Ringger et al. ............. 704/10 |
| 2003/0182120 | A1 | 9/2003 | Hwang |
| 2003/0187642 | A1 | 10/2003 | Ponceleon et al. |
| 2003/0191625 | A1 | 10/2003 | Gorin et al. |
| 2003/0212543 | A1 | 11/2003 | Epstein et al. |
| 2003/0212544 | A1 | 11/2003 | Acero et al. |
| 2004/0064464 | A1 | 4/2004 | Forman et al. |
| 2006/0178869 | A1 | 8/2006 | Acero et al. |

OTHER PUBLICATIONS

F. Bechet, A.L. Gorin, J.H. Wright, and D. Hakkani-Tur, "Detecting and extracting named entities from spontaneous speech in a mixed initiative spoken dialogue context: How may I help you?," Speech Commun., vol. 42/2, pp. 207-225, 2004.

Schapire et al., "Boosting with prior knowledge for call classification", IEEE Transactions on Speech and Audio Processing IEEE USA, vol. 13, No. 2, Mar. 2005, pp. 174-181.

Dagan et al., "Statistical and Learning Methods in Natural Language Processing", University Courses [Online], 2004, pp. 40-41.

Tur et al., "Combining Active and Semi-Supervised Learning for Spoken Language Understanding", Speech Communication, vol. 45, No. 2, Feb. 2005, pp. 171-186.

Gupta et al., "The AT&T Spoken Language Understanding System", IEEE Transactions on Audio, Speech and Language Processing IEEE USA, vol. 14, No. 1, Jan. 2006, pp. 213-222.

Chinchor, Nancy, "MUC-7 Named Entity Task Definition", Sep. 17, 1997, 27 pages.

Daelemans et al., "Proceedings of CoNLL-2003", The Seventh Conference on Natural Language Learning, (2003), 4 pages.

"SRILM—The SRI Language Modeling Toolkit", 2 pages, Downloaded on Jul. 11, 2005, file://C:\unzipped\ids%20zipped\SRI%20Language%20Toolkit.htm, Last updated Date: Aug. 8, 2004 by stoicke@speech.sri.com.

Bikel, Daniel M. et al., "An Algorithm that Learns What's in a Name", Journal Machine Learning—Special issue on natural language learning, vol. 34, Issue 1-3, Feb. 1999, pp. 211-231.

Borthwick, Andrew, et al., "Exploiting Diverse Knowledge Sources via Maximum Entropy in Named Entity Recognition", pp. 152-160, 1998.

Carreras, Xavier et al., "Named Entity Extraction using AdaBoost", 4 pages, Proceeding—COLING-02 proceedings of the 6$^{th}$ conference on Natural language learning, vol. 20, 2002.

Hai L. Chieu et al., "Named Entity Recognition: A Maximum Entropy Approach Using Global Information", 7 pages, Proceedings: COLING '02 Proceedings of the 19$^{th}$ International Conference on Computational Linguistics, vol. 1, 2002.

Kenneth W. Church, "A Stochastic Parts Program and Noun Phrase Parser for Unrestricted Text", 8 pages, Proceedings of the Second Conference on Applied Natural Language Processing, 1988.

Philip Clarkson et al., "Statistical Language Modeling Using the CMU-Cambridge Toolkit", 4 pages, Proceedings Eurospeech '97, Sep. 1997.

Michael Levit et al., "Aspects of Named Entity Processing", 4 pages, Published in Proceedings Eurospeech '97, Sep. 1997.

Christopher D. Manning et al., "Foundations of Statistical Natural Language Processing", Chapter 6, 2 pages, 1999.

Vasin Punyakanok et al., "The Use of Classifiers in Sequential Inference", 7 pages, 2001.

Salim Roukos, "Language Representation" Survey of the State of the Art in Human Language Technology, IBM, Chapter 1.6, pp. 30-35, 1997.

Guogong Zhou et al., "Named Entity Recognition using an HMM-based Chunk Tagger", ACL '02 Proceedings of the 40$^{th}$ Annual Meeting on Association for Computational Linguistics, pp. 473-480, 2002.

* cited by examiner

METHODS AND SYSTEMS FOR NATURAL LANGUAGE UNDERSTANDING USING HUMAN KNOWLEDGE AND COLLECTED DATA

BACKGROUND OF THE INVENTION

1. Field of the Invention

The invention relates generally to natural language understanding, and more specifically to tagging.

2. Introduction

Voice recognition or understanding is a desirable input option for many types of human-system interfaces, for example personal computers, voice-controlled telephone services, and others as will be well known to the reader. One challenge of voice recognition relates to the complexity of recognizing natural language; language spoken by a human in the normal course of activity without specialized speaking constraints or limited vocabularies. The complexity of recognizing natural language arises both from inherent language and grammatical complexities as well as individualized speaking characteristics.

In the related art, there are at least two approaches to the development and use of a natural language understanding application. In the first approach, known as the data driven approach, a large body of data is collected. Part or all of the collected data is manually identified and suitably labeled. The labeled corpus of data is used to automatically develop a model which can be used by a run-time system for natural language understanding of an input content. In the second approach, handcrafted grammar rules, based on human knowledge of the application are developed and used for natural language understanding of an input content.

In some cases in the related art, natural language application development may combine the two approaches. For example, an application may use handcrafted rules when labeled data is not available, and then may switch to a data-driven approach when such data becomes available. As another example, when labeled data is available, an application may use both human knowledge and data to develop natural language understanding models. The present inventors believe that current approaches to natural language recognition fall short of providing a solution easily usable by humans in the course of normal activities.

SUMMARY

According to the present invention, there is provided a method of natural language understanding, comprising: developing a statistical model for a natural language understanding application using human knowledge exclusive of any data that is collected during execution of said application; and during execution of the application receiving a sequence of words and assigning a sequence of tags to said received sequence of words by using the developed model.

According to the present invention, there is also provided a system for natural language understanding, comprising: means for receiving sequences of words; means for developing a statistical model for natural language understanding using human knowledge and optionally using data previously received by the receiving means and subsequently annotated; and means, using the developed statistical model, for assigning sequences of tags to sequences of words received by the receiving means.

According to the present invention, there is further provided a system for natural language understanding, comprising: a language model building tool configured to use tag-related phrases to build at least one n-gram language model, wherein the phrases are obtained from at least one selected from a group consisting of: human knowledge and annotated collected data; a statistical classifier training tool configured to train a classifier model using a body of annotated collected data to model the dependency of a tag for a word on at least one feature of the word and on at least one tag of at least one previous word; and a model executor configured in run time to output a sequence of tags for an inputted sequence of words by using the statistical classifier model and the at least one language model in accordance with predetermined proportions.

BRIEF DESCRIPTION OF THE DRAWINGS

The invention is herein described, by way of example only, with reference to the accompanying drawings, wherein.

DETAILED DESCRIPTION

Described herein are embodiments of the current invention for developing and using models for natural language understanding, where the models are based on human knowledge and/or annotated collected data. In the context of the invention human knowledge is not limited to the knowledge of any one human but may be accumulated by any number of humans. The embodiments described herein provide for a data driven technique which progresses seamlessly along the continuum of the availability of annotated collected data.

The principles and operation of natural language understanding according to the present invention may be better understood with reference to the drawings and the accompanying description. All examples given below are non-limiting illustrations of the invention described and defined herein.

In the description below, the term "develop a model", "model development" and variations thereof, refer to one or more actions for rendering a model workable. For example, model development can include inter-alia: building a model, training a statistical classifier model, etc. In the description below, the terms, labeling, annotating, and variations thereof are used interchangeably.

Figure 1:
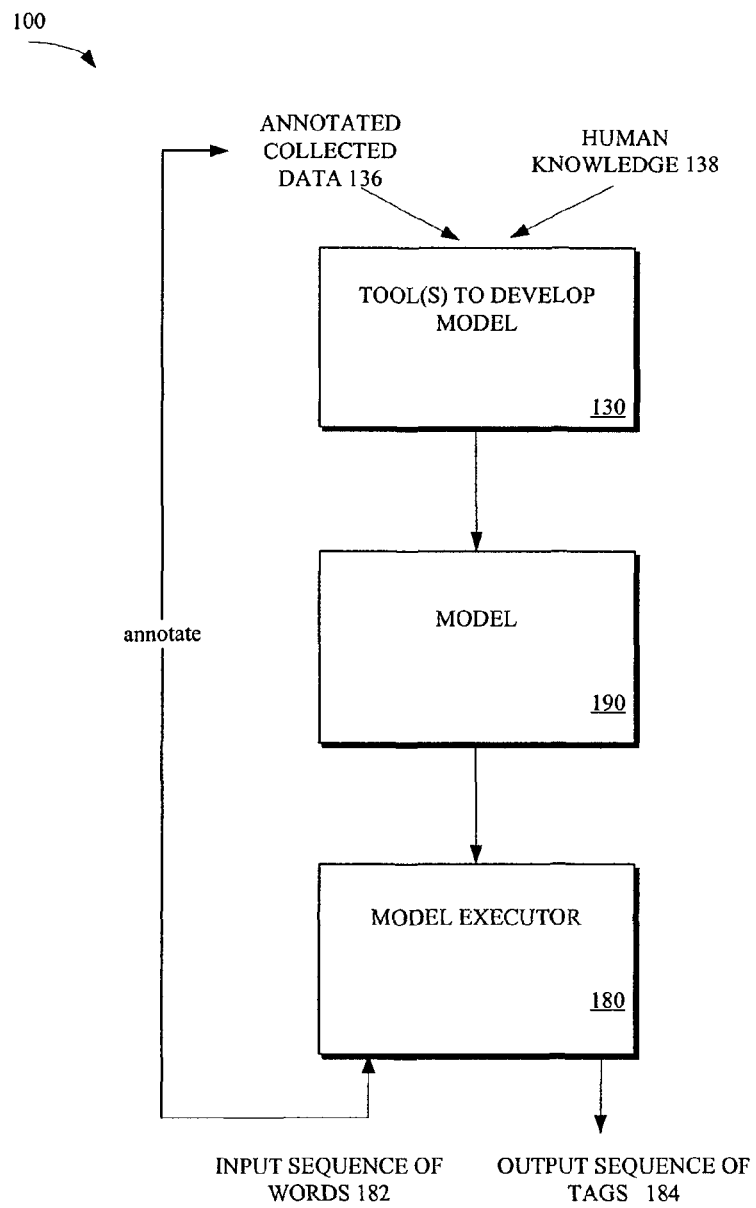
FIG. 1 is a block diagram of a system for natural language understanding, according to an embodiment of the invention.

Refer to FIG. 1 which is a block diagram of a system 100 for natural language understanding, according to an embodiment of the present invention. In the illustrated embodiment, system 100 includes one or more tools 130 to develop a model for understanding natural language, the developed model 190 for understanding natural language, and an executor 180 for using developed model 190. The separation of system 100 into modules 130, 180, 190 is for ease of explanation and in other embodiments, any of the modules may be separated into a plurality of modules or alternatively combined with any other module. In some embodiments, one or more of modules 130, 180 and/or 190 may be integrated into other module(s) of a larger system such as a speech recognizer.

Each of modules 130 and 190 can be made of any combination of software, hardware and/or firmware that performs the functions as defined and explained herein.

In some embodiments, model 190 is a statistical model which model executor 180 uses to determine weights, confidence levels, probabilities, probability distributions, and/or any other statistics useful in assigning a sequence of tags 184 for a given input sequence of words 182.

Examples of statistical models which depending on the embodiment may or may not be comprised in model 190 include inter-alia: n-gram language model(s) LM(s), statistical classifier model(s), other model(s) developed by any technique(s) (for example by counting and smoothing techniques) and a combination of one or more language model(s), statistical classifier model(s), and/or other model(s). In one embodiment, language models are used to predict the probability and/or function thereof (where the function can be a weight, confidence level, probability distribution and/or any other statistic) of the occurrence of a word which is associated with a given tag, where the prediction is based on one or more factors. For example, a bi-gram LM can be used to predict the probability of the word occurring based on the immediately preceding word, and an n-gram LM can be used to predict the probability of the word occurring based on the previous n words. Classifier models can be used to estimate any conditional probability. For example, in one embodiment a classifier model is used in order to predict the probability and/or function thereof of a tag being assigned to a given word based on one or more factors, where the factors can include one or more of the following inter-alia: feature(s) of the given word, tag(s) of previous n words, etc.

In some cases, one or more replacement models 190 are developed at different stages of the developmental life-cycle of a natural language understanding application, as will be explained in more detail below with reference to FIG. 2. Depending on the embodiment the same and/or different tool(s) 130 can be used to develop the original model and any replacement models used in the developmental life-cycle.

Typically although not necessarily, data collected during the operation (running) of a particular natural language understanding application by model executor 180 or in some cases data collected during the operation of related and/or similar natural language understanding applications is manually annotated to form or add to a body of data which in some cases may be used by tools(s) 130 to develop model 190. This cycle is graphically illustrated in FIG. 1 by the arrow leading from sequence of words 182 to annotated collected data 136. Sufficient annotated collected data 136 is therefore typically not available in the early stages of the developmental life cycle of a natural language understanding application. Depending on the particular application, data collected in related and/or similar applications may or may not be usable by tool(s) 130 in developing model 190 for the particular application. The quantity of annotated collected data which is considered sufficient to be used by tool(s) 130 in developing model 190 may vary depending on the particular application.

Figure 2:
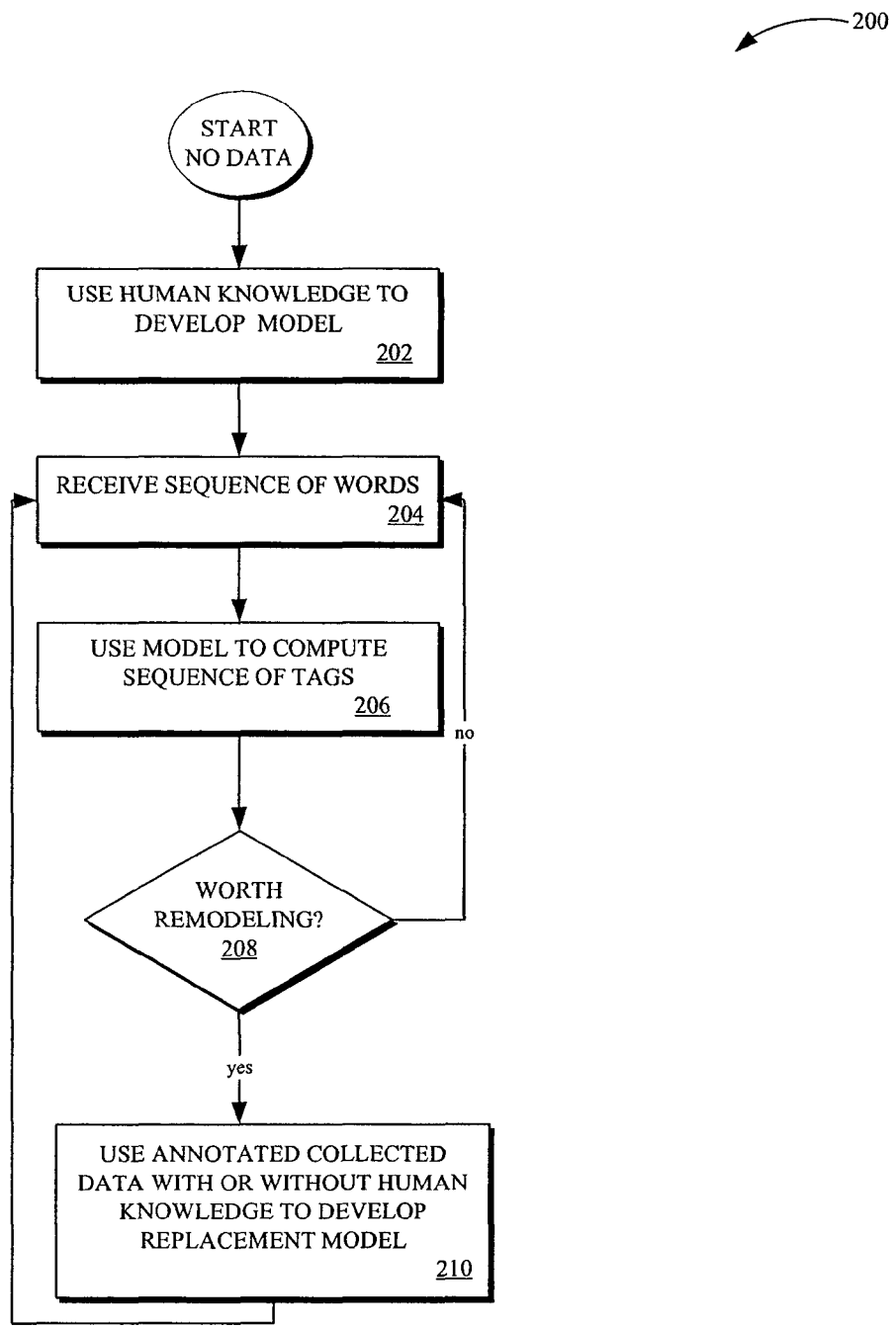
FIG. 2 is a flowchart of a method for natural language understanding, according to an embodiment of the present invention.

FIG. 2 is a flowchart of a method 200 for natural language understanding, according to an embodiment of the present invention. Method 200 can be executed for example by system 100. The invention is not bound by the specific stages or order of the stages illustrated and discussed with reference to FIG. 2. It should also be noted that alternative embodiments can include only selected stages from the illustrated embodiment of FIG. 2 and/or additional stages not illustrated in FIG. 2.

In accordance with the illustrated embodiment, when no annotated collected data is available for model development, for example in some cases in the initial development stages of a natural language understanding application, model developing tool(s) 130 uses human knowledge 138 to develop initial model 190 (stage 202) (i.e. in the initial development stages of a natural language application, human knowledge 138 exclusive of any annotated collected data 136 is used). For example, a developer may use his knowledge of the natural language understanding application to enumerate relevant phrases and these phrases can be used by tool(s) 130 to develop model 190. In stage 204, in operation of the natural language understanding application, an input sequence of words 182 is received. In stage 206, model executor 180 uses developed initial model 190 to understand the input, and computes a sequence of tags 184 corresponding to the input sequence of words 182. The input sequence of words 182 is collected and manually annotated (creating the beginnings of a body of annotated collected data 136). In stage 208, it is determined whether it is worth developing a replacement model 190. As long as it is not worth remodeling, for example because there is an insufficient body of annotated collected data 136, the existing model 190 is used by the natural language application (repeated stages 204 and 206). If and when it is determined that it is worth remodeling, for example, when sufficient data has been collected from stage 204 and manually annotated, the body of annotated collected data 136 is used instead of or in addition to human knowledge 138 by tool(s) 130 to develop replacement model 190 in stage 210. The amount of data which is considered sufficient to develop a replacement model may vary depending on the embodiment. The same or different developmental tool(s) 130 may be used to develop the replacement model 190 as were used to develop the replaced model 190. The replacement model 190 may be the equivalent model as the replaced model 190 (but redeveloped using the current body of annotated collected data and optionally human knowledge 138) or the replacement model 190 may be a different model. As additional collected annotated data 136 becomes available during the development of the natural language application, for example from additional runs of stage 204, new replacement models 190 may be developed in subsequent executions of stage 210.

In another embodiment, remodeling may be considered worthwhile in stage 208 based on new human knowledge 138 which becomes available (even if the amount or new amount of annotated collected data is not sufficient to warrant a replacement model), and in stage 210 a replacement model 190 may be developed using the newly available human knowledge 138, and optionally the previously available human knowledge 138 and/or annotated collected data 136.

In another embodiment, development of model 190 for the natural language understanding application (stage 202 and/or 210) may in some cases proceed simultaneously with running the application (any of stages 204 to 206).

As will be understood by the reader, system 100 and method 200 described above with reference to FIG. 1 and FIG. 2 are advantageous in that system 100 and method 200 can be used throughout the developmental life-cycle of the natural language application, from when there is no available annotated collected data to when there is any amount of annotated collected data.

The reader will also understand that the specific model which is suitable as model 190 may in some cases depend on one or more of the following inter-alia: the scope of human knowledge for a particular natural language understanding application, the domain of the particular application, the type of tagging desirable and/or necessary for the particular application, and the stage of the developmental life cycle of the particular natural language understanding application. If it is assumed that human knowledge for a particular application is broader, for example encompassing relevant phrases corresponding to each tag as well as the context in which a phrase corresponds to a tag, the developed model 190 used when only human knowledge is available and insufficient annotated collected data is available may in some cases also be broader, for example predicting for a given tag the probability of occurrence of a certain word based on the previous words as well as predicting for a given word the probability of corresponding to a certain tag based on the context/features of the word and the tags of previous words. If on the other hand it is assumed that human knowledge for a particular application is narrower, for example only encompassing relevant phrases corresponding to each tag, then the developed model 190 used when no annotated collected data is available and only human knowledge is available may in some cases also be narrower, for example predicting for a given tag the probability of occurrence of a certain word based on previous words.

The domain of the application in one embodiment determines what the natural language understanding application needs to be capable of understanding and the difficulty of correct tagging. For example in some embodiments different models 190 may need to be developed for different domains. As another example, if a domain includes similar/identical words which require different tags, models 190 which are more robust at discrimination may in some cases need to be developed than for a domain where there are less similar/identical words which require different tags.

Examples of tagging which may be desirable and/or necessary for a particular natural language understanding application includes one or more of the following inter-alia: identifying named entities NE, identifying noun phrase, identifying verb phrases, identifying independent clauses, identifying dependent clauses, and identifying relative clauses.

As mentioned above, in some cases for a particular application, model 190 may be changed one or more times during the developmental life cycle of the application. For example, assuming that in the initial developmental stage there is only human knowledge, then when sufficient annotated collected data 136 becomes available, in some cases a different replacement model 190 may be developed whereas in other cases an equivalent model may be redeveloped using the annotated collected data 136 and optionally human knowledge 138. (In other cases, the existing model 190 may not be changed during the developmental life cycle).

Regardless of which model(s) 190 are used during the developmental life cycle of the natural language understanding application, there is an advantage of being able to use human knowledge and/or annotated collected data to develop model(s) 190 within the framework of system 100.

Presented now are some models which can be used inter-alia as model 190 in one or more stages of method 200, depending on the suitability thereof for a particular natural language understanding application.

Given a sequence of words W=<$w_1, w_2, \ldots, w_k$> (input 182), a sequence of tags T*=<$t_1, t_2, \ldots, t_k$> (output 184) are assigned by model executor 180. Formally, model executor 180 computes:

T*=arg max P(T W)

$$T \in \{<t_1, t_2, \ldots, t_k> | 1 \leq i \leq k, t_1 \in \tau\} \tag{1}$$

where τ is the set of all possible tags that can be assigned to a word.

The n-gram tagging model requires rewriting P(T|W) in equation 1 as P(W|T)P(T) and applying the chain rule to expand P(W|T) and P(T) and then making some dependency assumptions. In this model, a word is assumed to depend only on the tag thereof and the tag of a word is assumed to depend only on the tags of previous n words. Equation 2 shows the result:

$$T^* = \underset{T}{\operatorname{argmax}} \prod_{1 \leq i \leq k} P(w_i|t_i)P(t_i|t_{i-n}, \ldots, t_{i-1}) \tag{2}$$

The distributions $P(w_1|t_1)$ and $P(t_i, t_{i-n}, \ldots, t_{i-1})$ can be induced, for example, by counting and applying some smoothing techniques.

In another approach, P(T|W) of equation 1 is directly expanded using the chain rule. An example of this approach is the Projection Based Markov Model (PMM). In the PMM model, it is assumed that the tag of a word depends on a) some limited context/features of the word and b) the tags of previous n words. Examples of features for a word include inter-alia: lexicographic features of the word, neighboring words, and features of neighboring words. Equation 3 shows the resulting relationship.

$$T^* = \underset{T}{\operatorname{argmax}} \prod_{1 \leq i \leq k} P(t_i|f(w_i), t_{i-n}, \ldots, t_{i-1}) \tag{3}$$

Where $f(w_i)$ refers to a set of features of word $w_i$. A statistical classifier can be trained to model $P(t_i|(w_i), t_{i-n}, \ldots, t_{i-1})$, i.e. given the features of a word and the tags of previous n words, the classifier can provide weights for each tag ti. Such weights can then be converted into probabilities using a suitable transformation, such as a logistic transformation.

In joint models, P(W,T) is computed instead of P(T|W). Ignoring P(W) does not impact computation of best T. P(W,T) is expanding using the chain rule. It is assumed that the tag for a word depends only on the previous n words and the tags of those words. Equation 4 shows the end result after these manipulations for a bi-gram case.

$$\begin{aligned} T^* &= \underset{T}{\operatorname{argmax}} \prod_{1 \leq i \leq k} P(w_i, t_i |, w_{i-1}, t_{i-1}) \\ &= \underset{T}{\operatorname{argmax}} \prod_{1 \leq i \leq k} (P(t_i |, t_{i-1}, w_{i-1}) \times P(w_i | t_i, t_{i-1}, w_{i-1})) \end{aligned} \tag{4}$$

The identifinder model is an example of a joint model as defined by equation 4. The identifinder model assumes that there are internal structures in the phrases to be tagged (for example in the phrases used for different NE's in the case of NE extraction) and also assumes that there are trigger words which indicate that the following words may be the beginning of a phrase to be tagged (for example the beginning of a specific NE in the case of NE extraction). Accordingly, two different situations are considered. When $t_i$ equals $t_{i-1}$, $P(w_i|t_{i-1}, W_{i-1})$ becomes $P(w_i|w_{i-1}, t_i)$, i.e. a bi-gram language model LM for tag $t_i$. When $t_i \neq t_{i-1}$, the sequence of words for tag $t_{i-1}$ ends with word $w_{i-1}$ and the sequence of words for tag $t_i$ begins with word $w_i$. To represent this, an imaginary token e, indicating the end of a word sequence for previous tags, is assumed between $w_{i-1}$ and $w_i$. After replacing $w_i$ with "ϵ, $w_i$" and after making further simplifying assumptions, the second term $P(w_i|t_{i-1}, W_{i-1})$ can be rewritten as $P(\epsilon|t_{i-1}, W_{i-1})P(w_i|\epsilon, t_i)$, where $P(\epsilon|t_{i-1}, W_{i-1})$ is the probability that the word $w_{i-1}$ is the last word of a phrase for tag $t_{i-1}$ and $P(w_i|\epsilon, t_i)$ is the probability that the word $w_i$ is the first word of a phrase for tag $t_i$.

Another model combines the PMM model described with reference to equation 3 with the identifinder model described above. In this combination model (herein below called PMM-LM), equation 4 is rewritten to generalize the dependency of $w_i$ and $t_i$ on n previous words and tags. As a consequence, the first term of equation 4, $P(t_i, t_{i-1}, w_{i-1})$, becomes $P(t_i|, w_{i-n}, w_{i-1}, t_{i-n}, t_{i-1})$ where $w_{i-n}, \ldots, w_{i-1}$ can be considered as features of word $w_i$ represented by $f(w_i)$. In some embodiments other features such as parts of speech and/or morphological features of $w_i$ can also be included in the feature set. Equation 5 describes the PMM-LM combination model (where the first term of equation 5 corresponds to a PMM model and the second term of equation 5 corresponds to an LM model):

$$T^* = \operatorname*{argmax}_T \prod_{1 \leq i \leq k} (P(t_i|f(w_i), t_{i-n}, \ldots, t_{i-1}) \times P(w_i|w_{i-n}, \ldots w_{i-1}, t_{i-n}\ldots t_i)) \quad (5)$$

The second term of equation 5 can be computed from tag-specific LMs as follows $$P(w_i \mid w_{i-n}, \ldots w_{i-1}, t_{i-n}\ldots t_i) = \quad (6)$$
$$\left(\prod_{2 \leq j \leq l} P(\varepsilon \mid w_{Ij-1}\ldots w_{Ij-1}, t_{Ij-1}) P(w_{Ij} \mid \varepsilon, t_{Ij})\right) \times P(w_i|w_{Il} \ldots w_{i-1}, t_{Il}))$$

Wherein $<I_1, \ldots, I_l>$ is the sequence of indices in ascending order such that in $t_{i-n}, \ldots, t_i$ for $2 \leq j \leq l$, $t_0 \neq t_{I_{l-1}}$ and $I_1 = i-n$ For example if AABC represents the tag sequence $t_{i-n}, \ldots, t_i$ and i=10, then for n=3 (i.e. history size 3) the sequence $<I_1, \ldots, I_l>$ is $<7, 9, 10>$ and l=3. Here, $P(w_i|w_{Il} \ldots w_{i-1}, t_{Il})$ is the probability that in a phrase for type $t_{Il}$ words $w_{Il} \ldots w_{i-1}$, will be followed by word $w_i$. $P(w_{Ij}|\epsilon, t_{Ij})$ is the probability that a phrase for type $t_{ij}$ begins with word $w_{Ij}$; and $P(\epsilon|w_{Ij-1}, \ldots w_{Ij-1}, t_{Ij-1})$ is the probability that a phrase for type $t_{Ij-1}$ ends with a sequence $w_{Ij-1}, \ldots w_{Ij-1}$.

Equation 7 shows a representation of a weighted PMM-LM model which enables the weighting of the PMM model (first term of equation 5) and the weighting of the LM model (second term of equation 5). The log of the probability is maximized and the parameter a ("alpha") ($0 \leq \alpha \leq 1$) is introduced to weight each term from equation 5:

$$T^* = \operatorname*{argmax}_T \sum_{1 \leq i \leq k} (\alpha \log(P(t_i \mid f(w_i), t_{i-n}, \ldots, t_{i-1})) + \quad (7)$$
$$(1-\alpha)\log(P(w_i \mid w_{i-n} \ldots w_{i-1}, t_{i-n} \ldots t_i)))$$

An example is now presented to further illustrate the weighted PMM-LM model described above with reference to equation 7. In this example it is assumed that for a particular natural language understanding application, the scope of human knowledge is sufficient to identify phrases associated with each tag, but insufficient to identify the context in which such phrases are tagged differently. Therefore, in this example human knowledge allows development of tag-specific n-gram language model for each tag in $\tau$, i.e. in the set of all possible tags that can be assigned to a word. However, in this example human knowledge is insufficient to develop a statistical classifier model for classifying words into corresponding tags.

Figure 3:
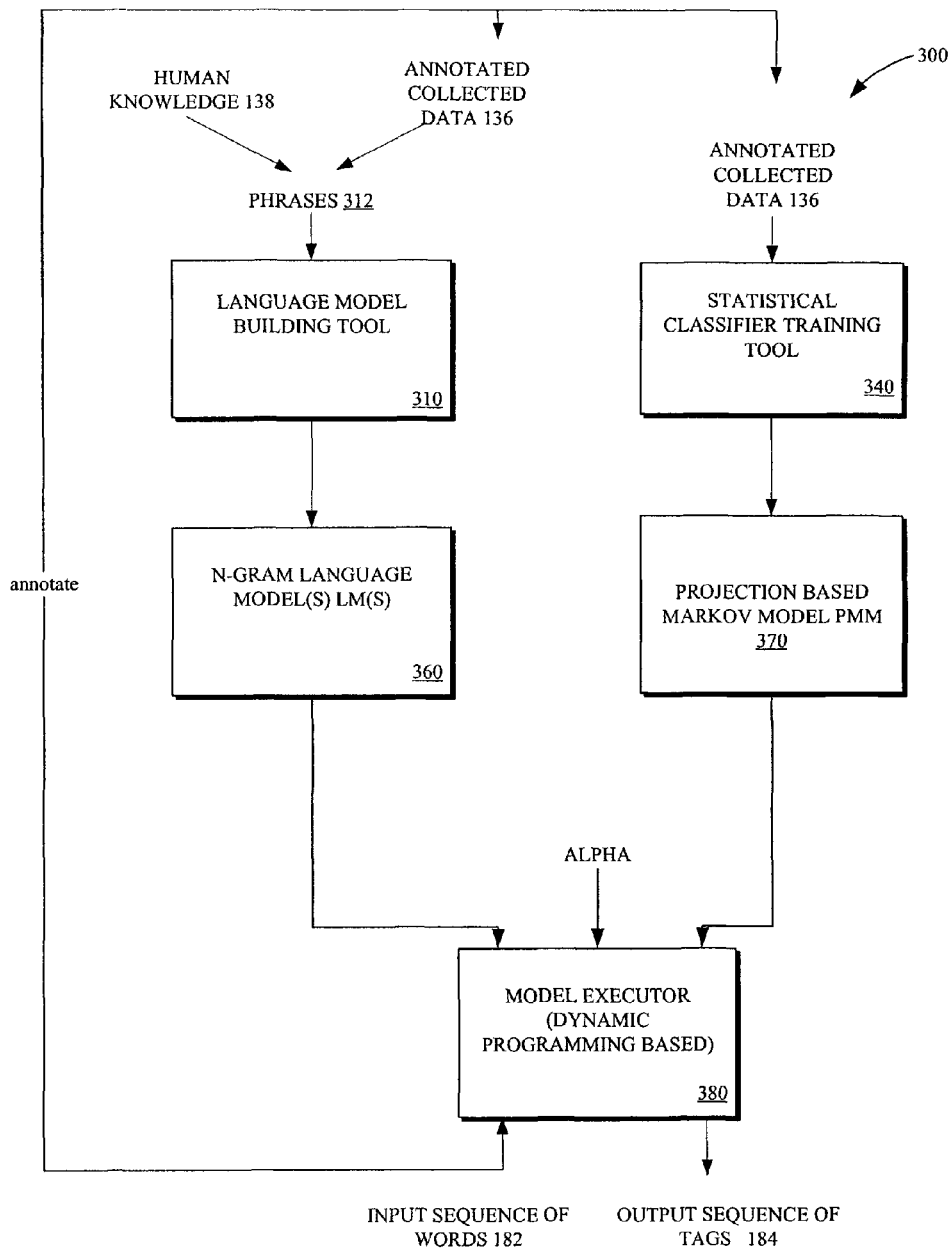
FIG. 3 is a block diagram of a system for natural language understanding using a weighted PMM-LM model, according to an embodiment of the present invention.

Continuing with the example, FIG. 3 is a block diagram illustrating a system 300 for natural language understanding using weighted PMM-LM as model 190, according to an embodiment of the present invention. In system 300, model developing tool(s) 130 used to develop model 190 (here weighted PMM-LM) comprise language model building tool 310 and statistical classifier training tool 340. In system 300, model 190 comprises n-gram language model(s) LM(s) 360 and a Projection Based Markov (statistical classifier) Model PMM 370. In system 300, model executor 180 comprises a dynamic programming based model executor 380 which is configured to compute output sequence of tags 184 by using LM(s) 360 and PMM 370 as appropriate for a predetermined alpha, (see below for more detail). The separation of system 300 into modules 310, 340, 360, 370, and 380 is for ease of explanation and in other embodiments, embodiments any of the modules may be separated into a plurality of modules or alternatively combined with any other module. In some embodiments, one or more of modules 310, 340, 360, 370 and 380 may be integrated into other module(s) of a larger system such as a speech recognizer.

Each of modules 310, 340, and 380 can be made of any combination of software, hardware and/or firmware that performs the functions as defined and explained herein. For example, language model building tool 310 can include the CMU-Cambridge Statistical Language Modeling Toolkit available at http://svr-www.eng.cam.ac.uk/-prc14/toolkit.html and/or the SRI Language Modeling Toolkit available at http://www.speech.sri.com/projects/srilm/download.html. For example statistical classifier training tool 340 can perform one or more of the following statistical classification techniques, inter-alia: Boosting, Decision Trees, SVM and Maximum entropy based. An example of a freely available statistical classifier training tool is Weka, available at http://www.cs.waikato.ac.nz/-ml/weka/. For example, model executor 380 may be built into a speech recognizer.

Figure 4A:
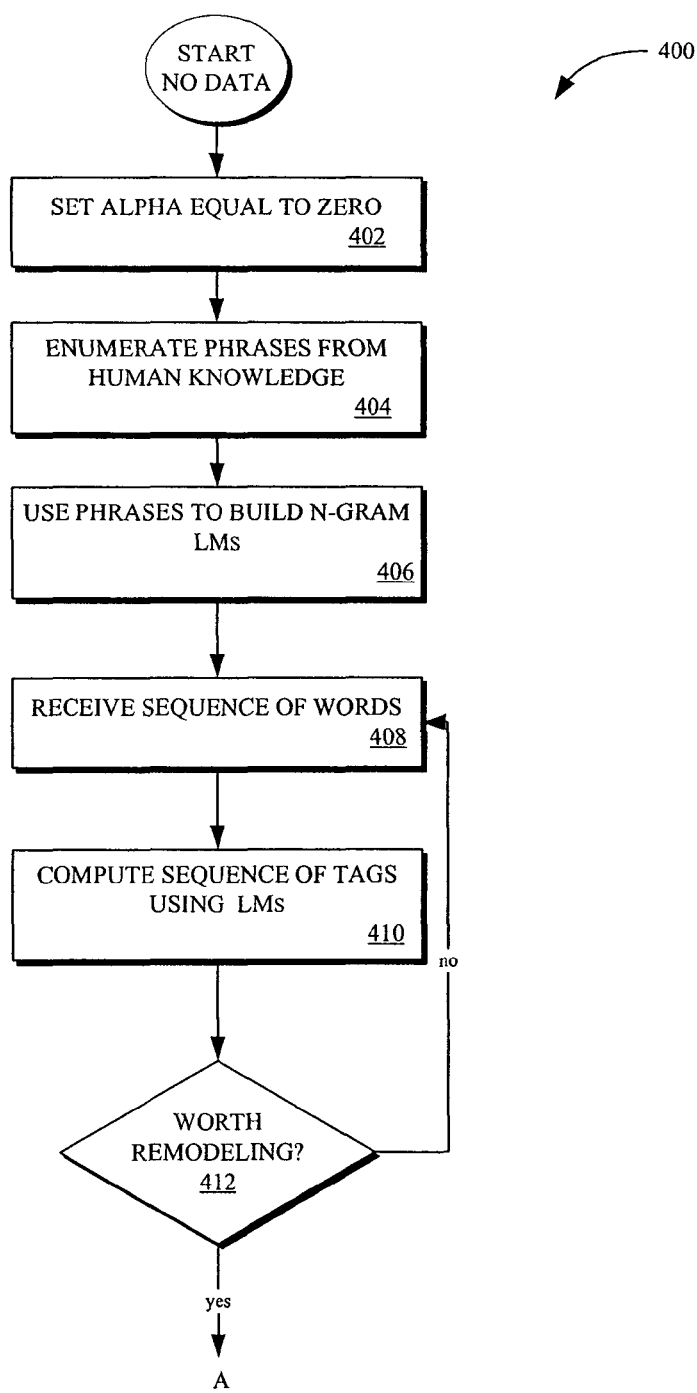
FIG. 4A is a flowchart of a method for natural language understanding using a weighted PMM-LM model, according to an embodiment of the present invention.

Continuing with the example, FIG. 4A is a flowchart of a method 400 for natural language understanding using the weighted PMM-LM model as model 190, according to an embodiment of the present invention. Method 400 can be executed for example by system 300. The invention is not bound by the specific stages or order of the stages illustrated and discussed with reference to FIG. 4A. It should also be noted that alternative embodiments can include only selected stages from the illustrated embodiment of FIG. 4A and/or additional stages not illustrated in FIG. 4A.

It is assumed that in the beginning of the development process of the particular natural there is no annotated collected data 136 and therefore model development relies on human knowledge 138 (i.e. human knowledge 138 exclusive of any annotated collected data 136 is used). It is further assumed in this example that human knowledge is 138 is adequate to build n-gram LMs 360 but inadequate to train PMM 370. Therefore in stage 402, alpha (of equation 7) is set to zero.

In stage 404, one or more phrases 312 for each tag in the set of all tags $\tau$ for the particular application are enumerated based on human knowledge 138. In stage 406, language model building tool 310 uses enumerated phrases 312 to build an n-gram LM 360 for each tag. In one embodiment, one LM 360 is required for each tag in the set of all possible tags $\tau$ for the particular application. In some embodiments, one or more LMs 360 in addition to those corresponding to tags may be built, for example an NoNE tag (see below for an explanation of the NoNE tag). In stage 408 during runtime, a sequence of words 182 is received. In stage 410, model executor 380 computes sequence of tags 184 by using LMs 360 to determine probabilities (i.e. $P(w_i|w_{\tilde{n}} \ldots w_{i-1},t_{\tilde{n}})$ $P(w_{\tilde{n}}|\epsilon, t_{\tilde{n}})$, $P(\epsilon|w_{\tilde{\iota}j-1}, \ldots w_{\tilde{\iota}j-1}, t_{\tilde{\iota}i-1}))$ discussed above with reference to equation 6. Because of the lack of annotated collected data 136, no PMM 370 has yet been developed and therefore PMM 370 is not used by model executor 380 in stage 410 when computing sequence of tags 184 (i.e. alpha is zero).

Figure 4B:
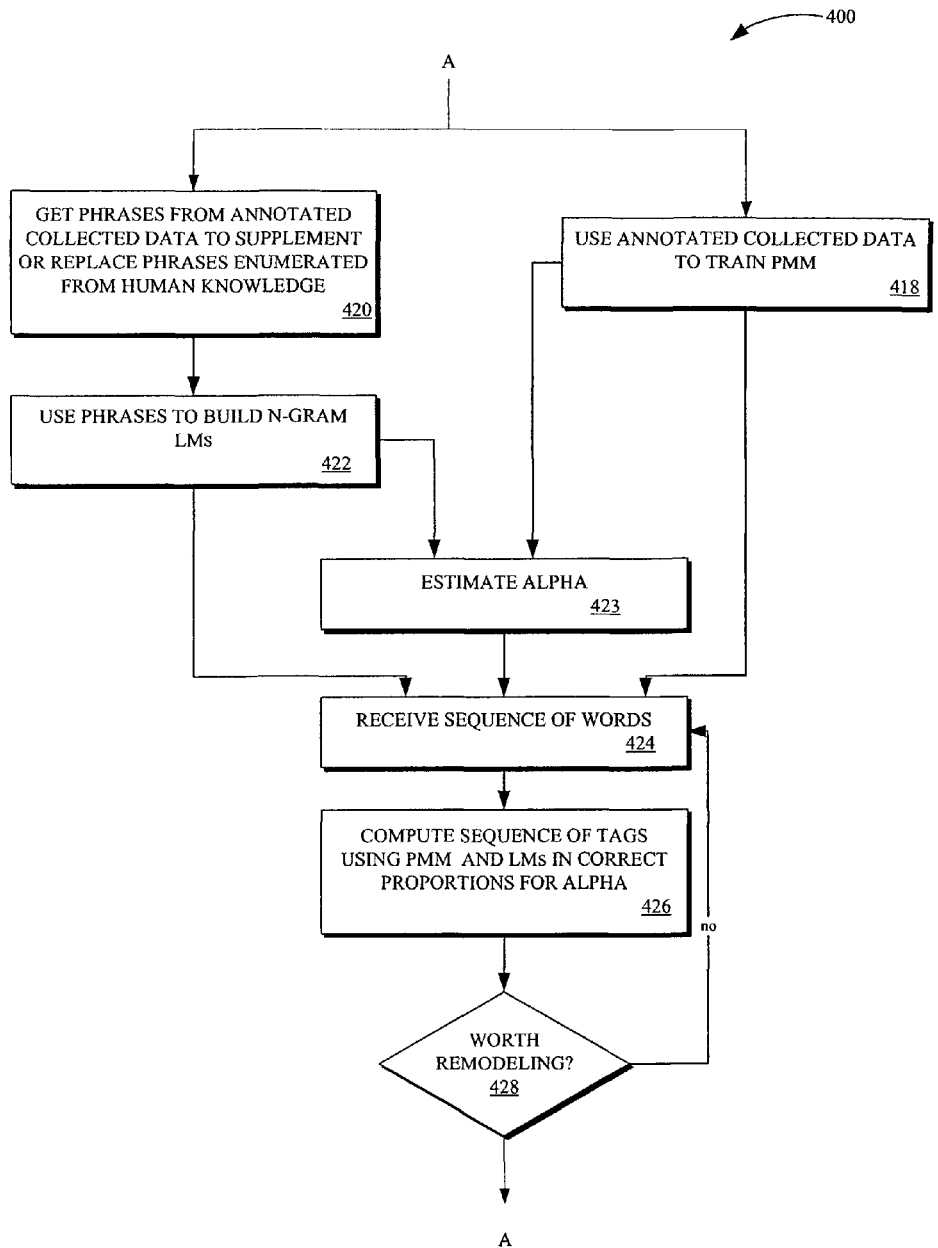
FIG. 4B continues the flow chart of FIG. 4A.

In stage 412 it is determined whether it is worth developing a replacement model 190 (where in this case the replacement model 190 would also be a weighted PMM-LM model). For example, if sufficient data has been collected during runtime (stages 408 and 410) and manually annotated, there may be a sufficiently large body of annotated collected data 136 for developing a replacement model 190. If it is not worth remodeling, the existing model 190 continues to be used during runtime stages 408 and 410. If it is worth remodeling, method 400 continues with stage 418. In stage 418 in FIG. 4B, the annotated collected data 136 is used by statistical classifier training tool 340 to train PMM 370. In stage 420, phrases 312 related to different tags are gathered. The gathered phrases 312 can be extracted from annotated collected data 136 and/or enumerated from human knowledge 138. The gathered phrases 312 may or may not include phrases which were used in stage 406 to build the previous n-gram LMs 360. In stage 422, gathered phrases 312 are used to build a replacement n-gram LM 360 for each tag (and optionally one or more other LMs may also be built, for example the NoNE tag as will be explained below). Depending on the embodiment, stage 418 may be performed in parallel with stages 420 and 422, or before or after stages 420 to 422.

In optional stage 423, alpha can optionally be adjusted. For example if there is a sufficient amount of annotated collected data 136, alpha may be set to a non-zero value.

In stage 424, during the running of the natural language understanding application, a sequence of words 182 is received. Model executor 380 in stage 426 determines sequence of tags 184 by using PMM 370 to compute probabilities and/or functions thereof (i.e. weights, confidence levels, probability distributions and/or any other statistics) related to the first term of equation 7 and language models 360 to compute probabilities and/or functions thereof (i.e. weights, confidence levels, probability distributions and/or any other statistics) related to the second term of equation 7, proportionately in accordance with the value of alpha. For example the probabilities related to the second term of equation 7 can include $P(w_i|w_{\tilde{n}} \ldots w_{i-1},t_{\tilde{n}})$, $P(w_{\tilde{n}}|\epsilon, t_{\tilde{n}})$, $P(\epsilon|w_{\tilde{\iota}j-1}, \ldots w_{\tilde{\iota}j-1}, t_{\tilde{\iota}i-1})$.

In stage 428 it is determined whether it is worth developing a replacement model 190, for example because more data has been collected and annotated.

If it is determined that it is not worth making a replacement model 190, method 400 repeats stages 424 through 428 (running the application with existing model 190).

If it worthwhile developing a replacement model 190, method 400 repeats stages 418 to 428. In this case, alpha may optionally be adjusted in the repetition of stage 423.

For example, when smaller amounts of annotated collected data 136 is available, as compared to human knowledge (in terms for example of the number of phrases 312), estimation of $P(t_i|(w_i),t_{i-n}, \ldots w,t_{i-1})$ may in some cases be considered unreliable and in these cases the contribution of $P(t_i|(w_i), t_{i-n}, \ldots w,t_{i-1})$ should be relatively smaller (for example by setting alpha of equation 7 to a relatively small number). Similarly when a larger amount of annotated collected data 136 becomes available, the contribution of $P(t_i|(w_i),t_{i-n}, \ldots w,t_{i-1})$ can in some cases be made relatively larger (for example by setting alpha of equation 7 to a relatively large number). The best value of alpha at each stage of the developmental life cycle of an application is not limited by the invention to any specific value. In some embodiments the best value of alpha at various stages of the developmental life cycle is determined empirically for the particular application. For example, in one of these embodiments, alpha is determined empirically each time a replacement model 190 (which is assumed in this case to each time be a weighted PMM-LM) is developed. For example, after developing the replacement weighted PMM-LM model as replacement model 190, some holdout data (i.e. data collected from input 182 and annotated but not used in developing replacement model 190) may be used to test the developed replacement model 190 for different alpha values. The alpha which gives the best performance is then selected and used with the developed replacement model 190 by model executor 380 when next executing stage 426.

In another embodiment, alpha may be adjusted at any stage of method 400, even without developing a replacement model 190. For example, alpha may be adjusted based on trial and error for a given application and/or stage of application development.

In another embodiment, remodeling may be considered worthwhile (stage 412 or 428) based on new human knowledge 138 which becomes available, and in any of stages 418 to 422 a replacement model 190 may be developed using the newly available human knowledge 138, and optionally the previously available human knowledge 138 and/or annotated collected data 136.

In another embodiment, development of model 190 for the natural language understanding application (any of stages 402 to 406 or stages 418 to 423) may in some cases proceed simultaneously with running the application (any of stages 408 to 410 or stages 424 to 426).

For further illustration of the weighted PMM-LM example, it is now assumed that the particular natural language understanding application using system 300 described above includes named entity NE extraction, where the named entities are sequences of words which refer to objects of interest in an application. In one embodiment, the named entities are any object or concept that can be the value of an argument in a predicate-argument representation of semantics.

It is further assumed for the sake of additional illustration, that the particular natural language understanding application is provided by a telephone company and that in the predicate Request(Contact_Info), the argument Contact_Info can refer to several objects such as phone number, voice mail, home address, etc. Therefore in accordance with these assumptions, phone number, voice mail, home address, etc are named entities NE's of type Contact_Info. Other examples of NEs in a commercial application for the telephone company are the names of the products and services offered, mode of payment, mode of shipment, etc. For example in the input, Can you give me the phone number of your Internet department, phone number is NE of type Contact_Info, whereas in the input my home phone number is not working, phone number is NE of type Services. Therein lies the difficulty of NE extraction from an input because the same sequence of words can refer to different types of NEs depending on the context.

In running a natural language application which performs NE extraction, each word or phrase of input 382 is tagged with one of a predefined set of tags which indicate the type of the NE the word refers to. Since in some cases not all words in input 382 refer to an NE, in some embodiments an additional tag indicating that a word does not refer to an NE, for example NONE, is used to tag those words.

Referring again to FIG. 4, some aspects of method 400 for the example adapted for NE extraction are now detailed. Human knowledge is assumed to comprise lists of NE phrases. In stages 404 and 420 phrases 312 that refer to different NEs are derived from human knowledge 138 and/or extracted from annotated collected data 136. Phrases 312 are used to build n-gram LMs in stages 406 and 422. During run-time in stage 410 and/or 426, the LM's are queried for probabilities 364 used in equation 6, i.e. a) $P(w_i|w_I \ldots w_{i-1}, t_{Ii})$ probability that in a phrase for NE type $t_{Ii}$, words $W_{Ii}$, will be followed by word $W_i$; b) $P(w_{Ii}|\epsilon, t_{Ij})$ probability that a phrase for NE type $t_{Ii}$, begins with word $W_{Ij|}$; and c) $P(\epsilon|w_{Ij-1}, \ldots w_{Ij-1}, t_{Ij-1})$ probability that a phrase for type $t_{Ii-1}$, ends with a sequence $w_{Ij-1}, \ldots w_{Ij-1}$. During run-time in stage 426, given the features of a word and tags of previous n words, classifier 340 outputs the probability of the word being tagged as NE type ti.

In one embodiment, method 400 for NEs requires LMs for all tags, even for the NoNE tag. In the absence of annotated data, one way to build LM for NoNE using text that may be available from other similar applications, as long as NE phrases that may have been present are removed from the text.

As will be understood by the reader, the systems and methods of the invention described above are advantageous in that the systems and methods can be used throughout the developmental life-cycle of the natural language application, from when there is no available annotated collected data to when there is any amount of annotated collected data. It is particularly advantageous that the systems and methods of the current invention can use models for natural language understanding even when no annotated data is available.

While the invention has been described with respect to a limited number of embodiments, it will be appreciated that it is not thus limited and that many variations, modifications, improvements and other applications of the invention will now be apparent to the reader.

The invention claimed is:

1. A method comprising:
   developing, via a processor, a statistical model for a natural language understanding application exclusive of annotated data;
   during first execution of the natural language understanding application, assigning a sequence of tags to a first received sequence of words using the statistical model, to yield annotated words;
   developing a replacement statistical model for the natural language understanding application using the annotated words, wherein developing the replacement statistical model comprises:
      developing a first part without human knowledge;
      developing a second part using the human knowledge and the annotated words; and
      assigning weighted versions of the first part and the second part to the replacement statistical model, wherein the weighted versions are determined based on an amount of annotated data that is available; and
   during a second execution of the natural language understanding application, assigning a second sequence of tags to a second received sequence of words by using the replacement statistical model.

2. The method of claim 1, wherein developing of the replacement statistical model comprises using both human knowledge and the annotated words.

3. The method of claim 1, wherein the sequence of tags comprises tags from a predefined set of tags relating to different types of named entities.

4. The method of claim 1, wherein developing of the replacement statistical model comprises:
   enumerating a phrase based on human knowledge for each tag in a predetermined set of possible tags for the natural language understanding application, to yield an enumerated phrase; and
   developing a language model for each tag in the predetermined set of tags based on the enumerated phrase.

5. The method of claim 1, further comprising replacing the statistical model with the replacement statistical model.

6. The method of claim 1, further comprising determining if the replacement statistical model is sufficiently different than the statistical model to replace the statistical model.

7. A system comprising:
   a processor; and
   a computer-readable storage medium having instructions stored which, when executed by the processor, result in the processor performing operations comprising:
      developing a statistical model for a natural language understanding application exclusive of annotated data;
      during first execution of the natural language understanding application, assigning a sequence of tags to a first received sequence of words using the statistical model, to yield annotated words;
      developing a replacement statistical model for the natural language understanding application using the annotated words, wherein developing the replacement statistical model comprises:
         developing a first part without human knowledge;
         developing a second part using the human knowledge and the annotated words; and
         assigning weighted versions of the first part and the second part to the replacement statistical model, wherein the weighted versions are determined based on an amount of annotated data that is available; and
      during a second execution of the natural language understanding application, assigning a second sequence of tags to a second received sequence of words by using the replacement statistical model.

8. The system of claim 7, wherein developing of the replacement statistical model comprises using both human knowledge and the annotated words.

9. The system of claim 7, wherein the sequence of tags comprises tags from a predefined set of tags relating to different types of named entities.

10. The system of claim 7, wherein developing of the replacement statistical model comprises:
    enumerating a phrase based on human knowledge for each tag in a predetermined set of possible tags for the natural language understanding application, to yield an enumerated phrase; and
    developing a language model for each tag in the predetermined set of tags based on the enumerated phrase.

11. The system of claim 7, the computer-readable storage medium having additional instructions stored which result in the operations further comprising replacing the statistical model with the replacement statistical model.

12. The system of claim 7, the computer-readable storage medium having additional instructions stored which result in the operations further comprising determining if the replacement statistical model is sufficiently different than the statistical model to replace the statistical model.

13. A non-transitory computer readable storage medium having instructions stored which, when executed by a computing device, result in the computing device performing operations comprising:

developing a statistical model for a natural language understanding application exclusive of annotated data;

during first execution of the natural language understanding application, assigning a sequence of tags to a first received sequence of words using the statistical model, to yield annotated words;

developing a replacement statistical model for the natural language understanding application using the annotated words, wherein developing the replacement statistical model comprises:

developing a first part without human knowledge;

developing a second part using the human knowledge and the annotated words; and assigning weighted versions of the first part and the second part to the replacement statistical model, wherein the weighted versions are determined based on an amount of annotated data that is available; and during a second execution of the natural language understanding application, assigning a second sequence of tags to a second received sequence of words by using the replacement statistical model.

14. The speech recognizer of claim 13, wherein developing of the replacement statistical model comprises using both human knowledge and the annotated words.

15. The speech recognizer of claim 13, wherein the sequence of tags comprises tags from a predefined set of tags relating to different types of named entities.

16. The speech recognizer of claim 13, wherein developing of the replacement statistical model comprises:

enumerating a phrase based on human knowledge for each tag in a predetermined set of possible tags for the natural language understanding application, to yield an enumerated phrase; and developing a language model for each tag in the predetermined set of tags based on the enumerated phrase.

17. The speech recognizer of claim 13, the speech recognizer having additional instructions stored which result in the operations further comprising replacing the statistical model with the replacement statistical model.

* * * * *